United States Patent
Dewerth, Jr.

(10) Patent No.: US 11,851,314 B2
(45) Date of Patent: Dec. 26, 2023

(54) SIMULTANEOUS MULTIPLE CONTAINER SIZE FILLER

(71) Applicant: SWIMC LLC, Cleveland, OH (US)

(72) Inventor: Alan E. Dewerth, Jr., Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 25 days.

(21) Appl. No.: 17/634,617

(22) PCT Filed: Aug. 14, 2020

(86) PCT No.: PCT/US2020/046428
§ 371 (c)(1),
(2) Date: Feb. 11, 2022

(87) PCT Pub. No.: WO2021/030714
PCT Pub. Date: Feb. 18, 2021

(65) Prior Publication Data
US 2022/0324690 A1 Oct. 13, 2022

Related U.S. Application Data

(60) Provisional application No. 62/887,255, filed on Aug. 15, 2019.

(51) Int. Cl.
*B67C 3/22* (2006.01)
*B67C 7/00* (2006.01)
*B67C 3/26* (2006.01)

(52) U.S. Cl.
CPC ............ *B67C 3/225* (2013.01); *B67C 7/0046* (2013.01); *B67C 2003/2668* (2013.01)

(58) Field of Classification Search
CPC .............................. B67C 7/0046; B67C 3/225
See application file for complete search history.

(56) References Cited

U.S. PATENT DOCUMENTS 2,775,269 A * 12/1956 Breeback .............. B67C 7/0006
141/237
3,047,032 A 7/1962 Carter
(Continued)

FOREIGN PATENT DOCUMENTS

GB 340737 A 9/1930

OTHER PUBLICATIONS

International Search Report and Written Opinion for PCT/US2020/046428, issued by the US Patent and Trademark Office dated Nov. 9, 2020; 16 pgs.

*Primary Examiner* — Jason K Niesz
(74) *Attorney, Agent, or Firm* — Mueting Raasch Group

(57) ABSTRACT

A filling apparatus configured to simultaneously fill multiple containers of different shapes and sizes. The filling apparatus including a feed conveyor mechanism including two or more feed conveyors, wherein each of the two or more conveyors is respectively configured to transport an empty fluid container of a different size along a manufacturing line, a turntable mechanism including two or more concentric rings, wherein each of the two or more concentric rings is configured to receive an empty fluid container from the respective two or more feed conveyors and rotate about a common axis while filling the empty fluid containers via at least to fill ports, and an output conveyor mechanism including two or more output conveyors, wherein each of the two or more output conveyors is respectively configured to receive a filled fluid container of a different size from the turntable mechanism for transport along the manufacturing line.

24 Claims, 5 Drawing Sheets

(56) References Cited

U.S. PATENT DOCUMENTS

| | | | |
|---|---|---|---|
| 4,259,999 A | 4/1981 | Wada | |
| 5,261,207 A * | 11/1993 | Bedin | B67C 7/0046 |
| | | | 53/308 |
| 7,866,123 B2 * | 1/2011 | Clusserath | B67C 7/002 |
| | | | 141/144 |
| 2004/0168401 A1 | 9/2004 | Bocker et al. | |
| 2005/0045244 A1 * | 3/2005 | Hartness | B67C 3/24 |
| | | | 141/144 |
| 2021/0380388 A1 * | 12/2021 | Franceschini | B65G 47/04 |

* cited by examiner

SIMULTANEOUS MULTIPLE CONTAINER SIZE FILLER

RELATED APPLICATIONS

This application is the § 371 U.S. National Stage of International Application No. PCT/US2020/046428, filed 14 Aug. 2020, which claims the benefit under 35 U.S.C. Section 119 of U.S. Provisional Patent Application Ser. No. 62/887,255 entitled "SIMULTANEOUS MULTIPLE PACKAGE SIZE FILLER" and filed on Aug. 15, 2019, the disclosures of which are incorporated herein by reference in their entireties.

TECHNICAL FIELD

The present disclosure relates generally to container filling systems and methods, and more particularly to a fluid filling line configured to continuously and simultaneously fill multiple containers of different shapes and/or sizes with a common fluid.

BACKGROUND

The term "coating product" is used to cover a variety of liquid coating materials such as paints, enamels, lacquers, varnishes, under coats, surfaces, primers, sealers, fillers, and stoppers. Most coating products contain a pigment, a resin polymer which acts as a film-former and in a coalesced applied coating film a binder to bind the pigment particles together, and water or solvent as a diluent. Coating products are often available in many different colors sheens (e.g., gloss, semi gloss, satin, and flat), quality levels (e.g., good, better and best), uses (e.g., indoor/outdoor, rust inhibiting, adhesion to particular surfaces, etc.), and quantities (e.g., quart, gallon, 5-gallon, etc.).

To meet customer needs, manufacturers offering all combinations of these colors, sheens, quality levels, uses, and quantities need to produce and handle a wide variety of coating products. From a manufacturing perspective, a significant investment in equipment may be necessary to handle the production of coating products.

Over the years, various machines for the batch manufacturing and packaging of coating and other liquid products have been developed. Two such machines common to the industry are in-line fillers and rotary fillers. With both types of fillers, a series of empty containers (e.g., cans or other vessels) are fed into the machine and conveyed along a feed track to be positioned beneath a dispensing nozzle. With in-line fillers, the container pauses beneath the dispensing nozzle while the container is filled. With rotary fillers, the dispensing nozzle rotates about a common axis with the container during the fill process, thereby enabling a more continuous throughput in comparison to in-line fillers.

In some cases, a plurality of dispensing nozzles, solenoid valves, or the like can be controlled for the automatic formulation of a particular coating or other liquid product as the coating containers are being filled. However, more commonly with batch systems, the coating or other liquid product is produced in a quality controlled batch of a given quantity, which is then used to fill the containers. During the fill process, various sensors can be utilized to ensure that the container has been filled to the appropriate level. A cover or lid can then be placed on the container and secured in position, thereby sealing the product within the container. Thereafter, the containers are conveyed along a track to a packing and distribution portion of the production line.

SUMMARY OF THE DISCLOSURE

Although such batch manufacturing systems have proven effective in enabling manufacturers to readily fill containers with liquids such as, e.g., coating products of varying color, sheen, quality level, and use, these systems are typically not accommodative to multiple different sizes of containers. That is, typically each batch filling machine is only adapted to accommodate a specific container size. Accordingly, either separate batches of coating or other liquid product must be produced to accommodate each production line, or the batch must be "split" between the production lines for different sized containers. Further, having separate fill lines for each size container significantly adds to the required space and investment in manufacturing equipment necessary to handle a wide variety of coating or other liquid products.

Although the systems and methods described herein may be particularly useful for packaging coating products in containers, the systems and methods may be equally useful in packaging any liquid product in suitable containers, e.g., liquid hand sanitizer or other personal care products, solvents (e.g., like acetone, methyl ethyl ketone (MEK), xylene, mineral spirits, alcohols, etc.), stripping products (e.g., products used to remove coatings, etc.), cleaning/sanitizing products, food products (e.g., beverages, condiments, etc.), motor vehicle products (e.g., motor oil, transmission fluid, brake fluid, coolants, etc.), and many others.

Embodiments of the present disclosure provide a continuous rotary split fill apparatus configured to enable the continuous and simultaneous filling of multiple containers of different shapes and sizes with a common batch of coating or other liquid product on a single, compact manufacturing line, thereby both minimizing the production time, required space and investment in manufacturing equipment necessary to handle a wide variety coating or other liquid products.

One embodiment of the present disclosure provides a rotary split filler apparatus configured to continuously fill fluid containers of different sizes in parallel. The filling apparatus can include a feed conveyor mechanism, a turntable mechanism and an output conveyor mechanism. The feed conveyor mechanism can include two or more feed conveyors, e.g., a first feed conveyor, a second feed conveyor, and an optional third feed conveyor. Each of the feed conveyors can respectively be configured to transport fluid containers of different sizes along a fluid production line. The turntable mechanism can include two or more concentric rings, e.g., a first ring, a concentric second ring, and an optional concentric third ring. Each of the concentric rings of the turntable mechanism can be configured to receive the fluid containers from the respective feed conveyors, position the fluid containers beneath a plurality of fill ports, and fill the fluid containers with respective designated quantities of fluid while the concentric rings rotate about a common axis. The output conveyor mechanism may include two or more output conveyors, e.g., first, second, and optional third output conveyors, each of which can be respectively configured to receive filled fluid containers of the respective different sizes from the turntable mechanism for further transport along the manufacturing/fluid production line.

In one embodiment, the filler apparatus can be configured to simultaneously fill fluid containers of different sizes. In one embodiment, the first, second and third sections of the turntable mechanism can be configured to rotate about the common axis at different rates to enable the filling of fluid containers of different sizes at different rates. In one embodiment, the filler apparatus can be configured to fill each of the different sized fluid containers from a common batch of fluid. In one embodiment, the different sized fluid containers can be respectively configured to contain approximately 1 quart, 1 gallon and 5-gallons of fluid; as discussed below, other fluid container sizes are also contemplated.

In one embodiment, the first, second and third concentric rings of the turntable mechanism can each include a plurality of fluid container receptacles configured to optimally position the fluid containers on the turntable mechanism. In one embodiment, the concentric second ring can be configured to receive a larger sized fluid container than the first ring. In one embodiment, the concentric third ring can be configured to receive a larger sized fluid container than the second ring. In one embodiment, each of the two or more concentric rings includes a plurality of fluid container receptacles configured to position the fluid containers on the two or more concentric rings, wherein the height of the fluid container receptacles in each of the two or more concentric rings is selected to position the fluid containers on each of the fluid container receptacles at a selected height relative a common reference height. In one embodiment, the common reference height is a height of the fill ports.

In one embodiment, the respective first, second and third feed conveyors can be radially positioned with respect to the common axis of the turntable mechanism. In one embodiment, at least one of the first, second and third feed conveyors can include a pair of opposed helical screws configured to separate fluid containers of a particular size from one another by a predefined distance during transport along the manufacturing line. In one embodiment, the respective first, second and third output conveyors can be tangentially positioned with respect to the respective first, second and third concentric rings of the turntable mechanism.

Another embodiment of the present disclosure provides a filling apparatus. The filling apparatus can include a feed conveyor mechanism, a turntable mechanism and an output conveyor mechanism. The feed conveyor mechanism can include two or more feed conveyors, each feed conveyor respectively configured to transport an empty fluid container of a different size along a manufacturing line. The turntable mechanism can include two or more concentric rings respectively configured to receive fluid containers from the respective two or more feed conveyors, position the fluid containers beneath a plurality of fill ports, and fill the empty fluid containers with respective designated quantities of fluid while rotating the concentric rings, fluid containers located thereon, and fill ports about a common axis. The output conveyor mechanism can include two or more output conveyors respectively configured to receive filled fluid containers from the turntable mechanism for further transport along a fluid production line.

In one or more embodiments of a fluid production line for fluid containers of different sizes, the fluid production line may include: a feed conveyor mechanism including a first feed conveyor, a second feed conveyor and a third feed conveyor, wherein each of the first, second and third feed conveyors is respectively configured to transport fluid containers of different sizes along the fluid production line; a turntable mechanism including a first section, a concentric second section and a concentric third section, wherein each of the first, second and third sections is configured to receive the fluid containers from the respective first, second and third feed conveyors and rotate about a common axis to position the fluid containers beneath a plurality of fill ports configured to fill each of the different sizes of the fluid containers positioned on the respective first, second and third sections with a desired quantity of fluid; and an output conveyor mechanism including a first output conveyor, a second output conveyor and a third output conveyor, wherein each of the first, second and third output conveyors is respectively configured to receive the filled fluid containers of different sizes from the turntable mechanism for transport along the fluid production line.

One embodiment of a fluid production line as described herein may include at least one of a container preparation station, a labeling station, a lidding station, a case packing station, a rotary elevator, and a distribution portion.

In one embodiment of a fluid production line as described, the first, second and third concentric sections of the turntable mechanism are configured to rotate about the common axis at different rates.

In one embodiment of a fluid production line as described herein, the fluid production line is configured to fill the fluid containers with a common fluid from a single batch of fluid.

In one embodiment of a fluid production line as described herein, the first, second and third concentric sections of the turntable mechanism each includes a plurality of fluid container receptacles configured to optimally position the empty fluid containers on the turntable mechanism.

In one embodiment of a fluid production line as described herein, the concentric second section is configured to receive a larger sized fluid container than the first section.

In one embodiment of a fluid production line as described herein, the concentric third section is configured to receive a larger sized fluid container than the concentric second section.

In one embodiment of a fluid production line as described herein, each of the first, second and third sections includes a plurality of fluid container receptacles configured to position the fluid containers on the first, second and third sections, wherein the height of the fluid container receptacles in each of the first, second and third sections is selected to position the fluid containers on each of the fluid container receptacles at a selected height relative a common reference height.

In one embodiment of a fluid production line as described herein, the respective first, second and third feed conveyors are radially positioned with respect to the common axis of the turntable mechanism.

In one embodiment of a fluid production line as described herein, at least one of the first, second and third feed conveyors includes a pair of opposed helical screws configured to separate empty fluid containers from one another by a predefined distance during transport along the fluid production line.

In one embodiment of a fluid production line as described herein, the respective first, second and third output conveyors are tangentially positioned with respect to the respective first, second and third sections of the turntable mechanism.

Another embodiment of the present disclosure provides a method of continuously filling fluid containers of different sizes in parallel. The method can include transporting a first fluid container of a first size and an empty second fluid container of a second size along a respective first feed conveyor and a second feed conveyor respectively; positioning the first fluid container and the second fluid container on a respective first ring and a second concentric ring of a turntable mechanism beneath a respective first fill port and a second fill port; filling the fluid containers with respective designated quantities of fluid via the first fill valve and the second fill valve the while rotating first and second fluid containers and, optionally, the first and second fill ports about a common axis; and receiving the filled first and second fluid containers from the turntable mechanism for transport along a respective first output conveyor and second output conveyor.

Embodiments of the present disclosure provide a filling apparatus configured to enable the continuous and simultaneous filling of multiple containers of different shapes and sizes with a common fluid from a single batch of coating or other liquid product. Accordingly, embodiments of the present disclosure alleviate the need to "split" a given batch of coating or other liquid product into two or more separate quantities, or the need to produce separate quality controlled batches of coating or other liquid product, for the filling of different container sizes. Alleviating these needs through the combination of multiple container-size lines into a single fluid production line further minimizes the production time and reduces the required space necessary for a fluid production line capable of handling a wide variety of coating or other liquid products.

The summary above is not intended to describe each illustrated embodiment or every implementation of the present disclosure. The figures and the detailed description that follow more particularly exemplify these embodiments.

BRIEF DESCRIPTION OF THE DRAWING

The disclosure can be more completely understood in consideration of the following detailed description of various embodiments of the disclosure, in connection with the accompanying drawings, in which.

Figure 1:
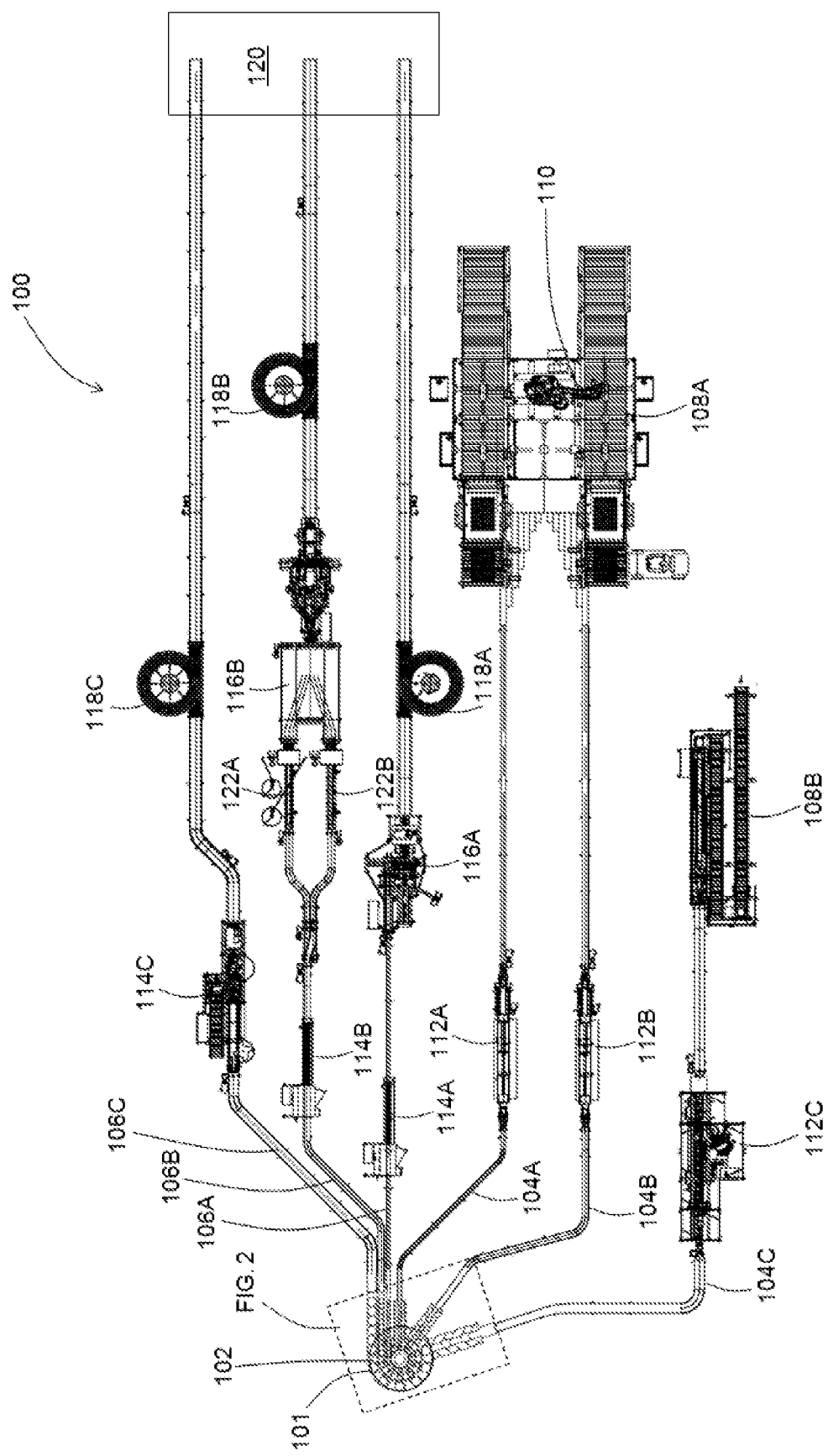
FIG. 1 is a plan view depicting a fluid production line configured to enable the continuous filling of multiple containers of different shapes and sizes in parallel from a common batch of fluid, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2:
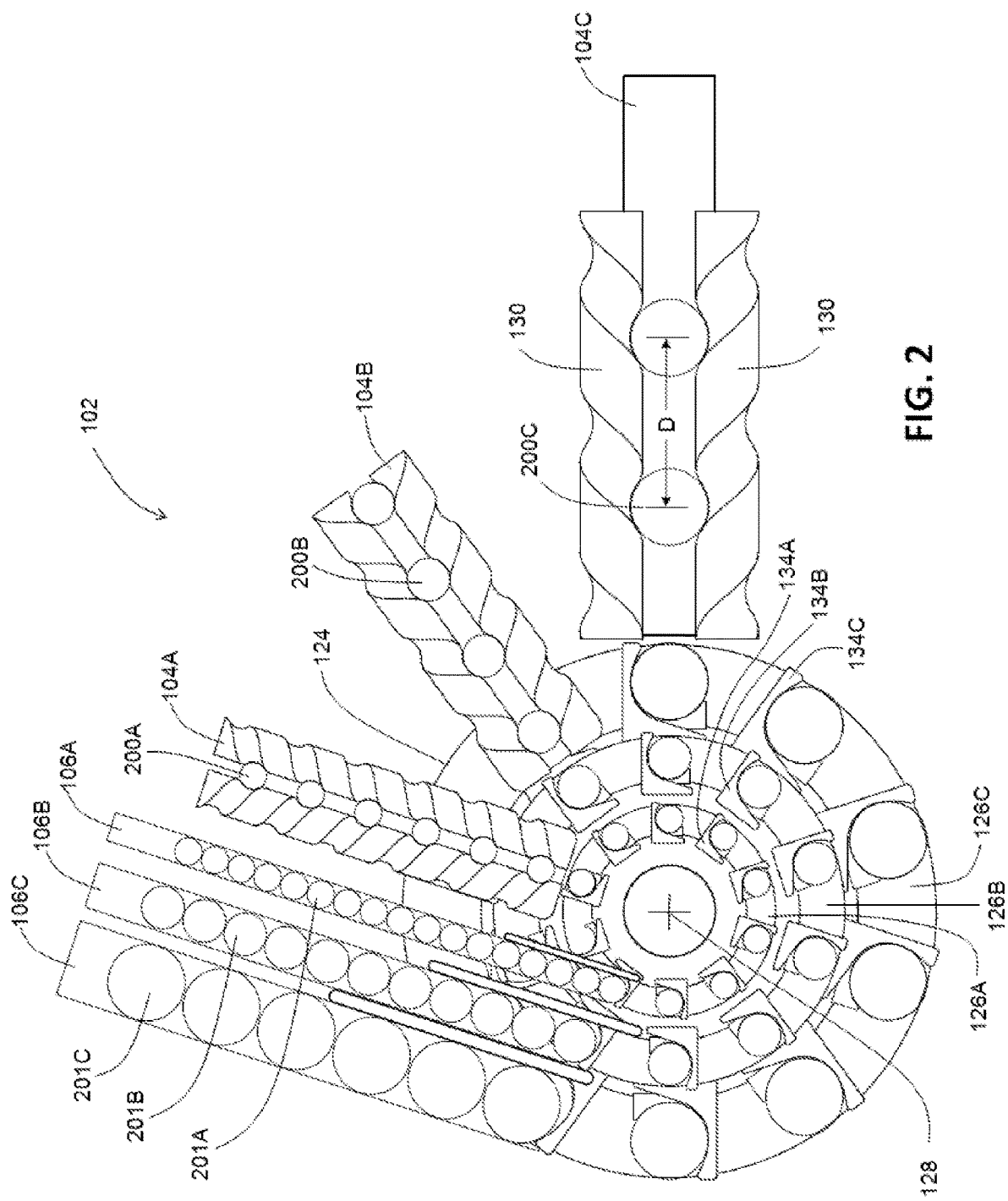
FIG. 2 is a plan view depicting a filling apparatus portion of the fluid production line of FIG. 1, in accordance with an embodiment of the disclosure.

Referring to FIG. 1, a plan view depicting a fluid production line 100 is depicted in accordance with an embodiment of the disclosure. In some embodiments, the fluid production line 100 is configured to enable the continuous filling of multiple containers of different shapes and sizes in parallel, with a common batch or different batches of a coating product 101 from a variety of suppliers, including SHERWIN-WILLIAMS, PPG, AKZO NOBEL, BEHR, NIPPON PAINT, and CLARIANT, to name just a few. The fluid production line 100 can include a continuous, rotary split filler 102, a close-up, plan view of which is depicted in FIG. 2.

In general, the fluid production line 100 can include two or more feed conveyors 104A-C (collectively referred to as a feed conveyor mechanism 104), which converge at the rotary split filler 102, and then separate into two or more output conveyors 106A-C (collectively referred to as an output conveyor mechanism 106). FIG. 1 depicts an embodiment having three feed conveyors 104A-C and three output conveyors 106A-C; however, other quantities of conveyors with more or fewer conveyors and more or fewer container sizes are also contemplated.

Each feed conveyor 104 and corresponding output conveyor 106 can be configured to accommodate a fluid container of a particular size. For example, in one non-limiting embodiment, the first feed conveyor 104A and corresponding first output conveyor 106A can be configured to accommodate containers having a normal internal fill volume of approximately 1-quart. The second feed conveyor 104B and corresponding second output conveyor 106B can be configured to accommodate containers having a normal internal fill volume of approximately 1-gallon. The third feed conveyor 104C and corresponding third output conveyor 106C can be configured to accommodate containers having a normal internal fill volume of approximately 5 gallons. Other conveyor configurations and container sizes are also contemplated. For example, the containers can have a normal internal fill volume of about ½-pint (0.24 L), 1-pint (0.47 L), 1-Liter, 1-quart (0.95 L), 1-gallon (3.79 L), 4-liters, 5.3-liters, 5-gallons (18.93 L), 20-liters, or any other desirable volume, and based on US fluid ounces, with the non-SI unit volumes being US or imperial units of measure as desired. The containers can be constructed of metal, glass, or plastic, and can have press-fit or screw-top lids or caps. Suitable containers of different shapes and sizes for use in the disclosed fluid production line 100 are available from a variety of suppliers, including BWAY, CARY CO., KW CONTAINER, and UNIVERSAL CAN CO., to name just a few.

In some embodiments, coating and other liquid products can be packaged in containers suitable for small batch lots. In the case of coating products, depending on the amount of pigmentation (e.g., white pigmentation) already present in a coating product, the container can have a small amount of headspace for colorant addition. For example, a one gallon (3.79 L) white base paint container can hold about 128 oz. (3.79 L) of the base paint, with only a small headspace volume available for colorant addition. A one gallon (3.79 L) clear base paint container can for example hold about 116 oz. (3.43 L) of a base paint, with about 12 oz. (0.35 L, or about 9% of the total container volume) of headspace available for colorant addition. When additional base paints of intermediate opacity are employed, they likewise can have intermediate available headspace volumes for colorant addition. For example, a four base system can employ the white and clear base paints mentioned above, together with a pastel base whose container has about 126 oz. (3.73 L) of base paint with about 2 oz. (0.06 L) of headspace available for colorant addition, and a standard color base whose container has about 124 oz. (3.57 L) of base paint with about 4 oz. (0.12 L) of headspace available for colorant addition.

As further depicted in FIG. 1, both the first feed conveyor 104A and the second feed conveyor 104B can originate at a container preparation station 108A, which in some embodiments can include one or more robotic arms 110 configured to unload containers from pallets for proper positioning on the respective first and second feed conveyors 104A/B. Thereafter, the containers can proceed to respective labeling stations 112A/B, where labels containing product information can be affixed to the containers. In other embodiments, the labeling stations 112A/B can be positioned further downstream, such that the labels are affixed to the containers after filling. In one or more embodiments, the containers originating at the container preparation station 108A may be empty.

Similarly, the third feed conveyor 104C can originate at a container preparation station 108B, which in some embodiments can be configured to de-nest 5-gallon containers (which may be empty). Thereafter, the containers can proceed to a labeling station 112C (which optionally can be positioned further downstream). Thereafter, the containers of different sizes can be conveyed along the respective first, second and third feed conveyors 104A-C to the rotary split filler 102.

Downstream of the rotary split filler 102, filled containers transported along the first output conveyor 106A can pass through a lidder station 114A, configured to secure a lid or cover onto the filled container, thereby safely and securely sealing the coating product within the container. The sealed, filled containers can then progress to a case packer station 116A configured to bundle the filled containers together in a desired quantity. The cases of filled containers can then proceed to a rotary elevator 118A to a distribution portion 120 of the fluid production line 100.

Similarly, downstream of the rotary split filler 102, filled containers transported along the second output conveyor 106B can pass through a lidder station 114B. Where it is desired to position a handle on the container, the containers can pass through a bailing station 122. In some embodiments, the second output conveyor 106B can be divided to pass through a pair of bailing stations 122A/B operating in parallel. The filled containers can proceed on to a case packer station 116B, a rotary elevator 118B, and to a distribution portion 120 of the fluid production line 100. Likewise, downstream of the rotary split filler 102, filled containers transported along the third output conveyor 106C can pass through a lidder station 114C, and a rotary elevator 118B to the distribution portion 120 of the fluid production line 100.

It is noted that the fluid production line 100 depicted in FIG. 1 represents one example embodiment and should not be considered to be limiting as to the number and order of operations. The positioning of the various stations and components may vary depending on the needs of the production line and the size and shape of the production facility.

The feed conveyor, output conveyor and other container handling stations and components of the fluid production line 100 can be provided by a number of filling equipment manufacturers. Suitable manufacturers include FEDERAL MANUFACTURING CO., FILAMATIC, APACKS, UNIVERSAL FILLING, E-PAK MACHINERY, INC., and FRAIN INDUSTRIES, to name just a few. After reviewing this disclosure, suitable filling equipment manufacturers of ordinary skill will be able to fabricate a fluid production line 100 including a rotary split filler 102, as described herein.

With reference to FIG. 2, the rotary split filler 102 can include a turntable mechanism 124 having two or more concentric rings/sections 126, which can be in communication with the two or more feed conveyors 104 and the two or more output conveyors 106. In some embodiments, the rotary split filler 102 can be configured with concentric rings/sections 126 that rotate about a common axis 128 to enable the continuous and simultaneous filling of multiple containers of different shapes and sizes with a common batch of coating product 101. FIG. 2 depicts an embodiment having three rings/sections 126A-C, with each ring/section configured to enable the filling of a different shape and/or size container; however other numbers of sections are also contemplated.

Figure 5:
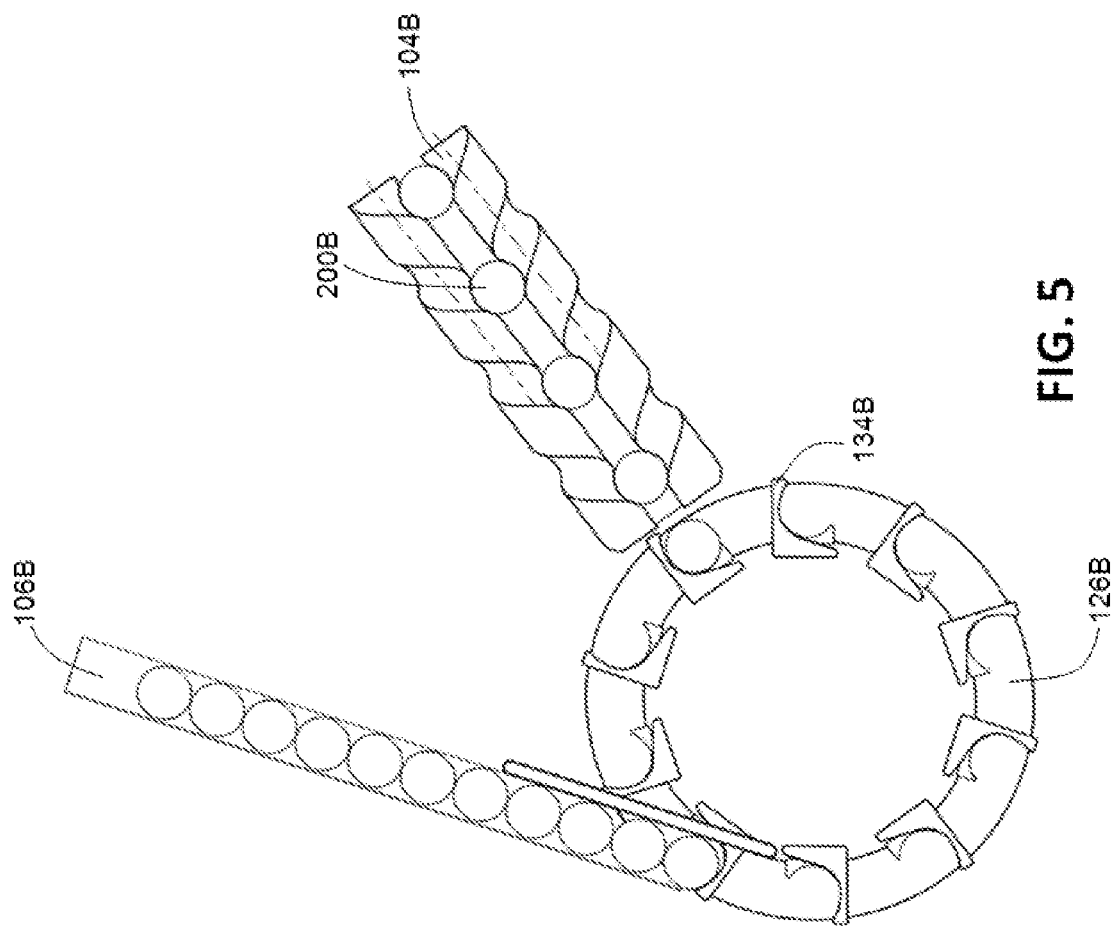
FIG. 5 is a plan view depicting a second feed conveyor, a second ring/section of a turntable mechanism, and a second output conveyor of the filling apparatus of FIG. 2 in isolation.
Figure 4:
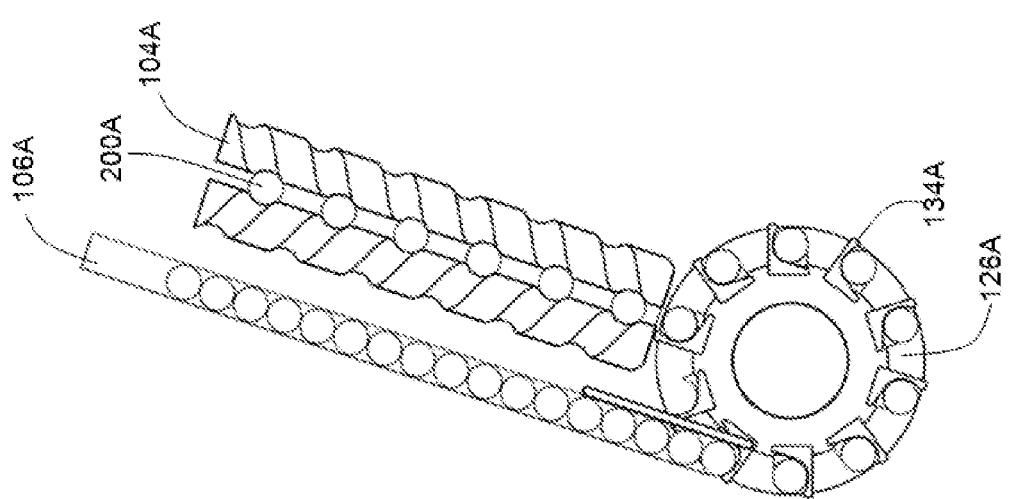
FIG. 4 is a plan view depicting a first feed conveyor, a first ring/section of a turntable mechanism, and a first output conveyor of the filling apparatus of FIG. 2 in isolation.
Figure 6:
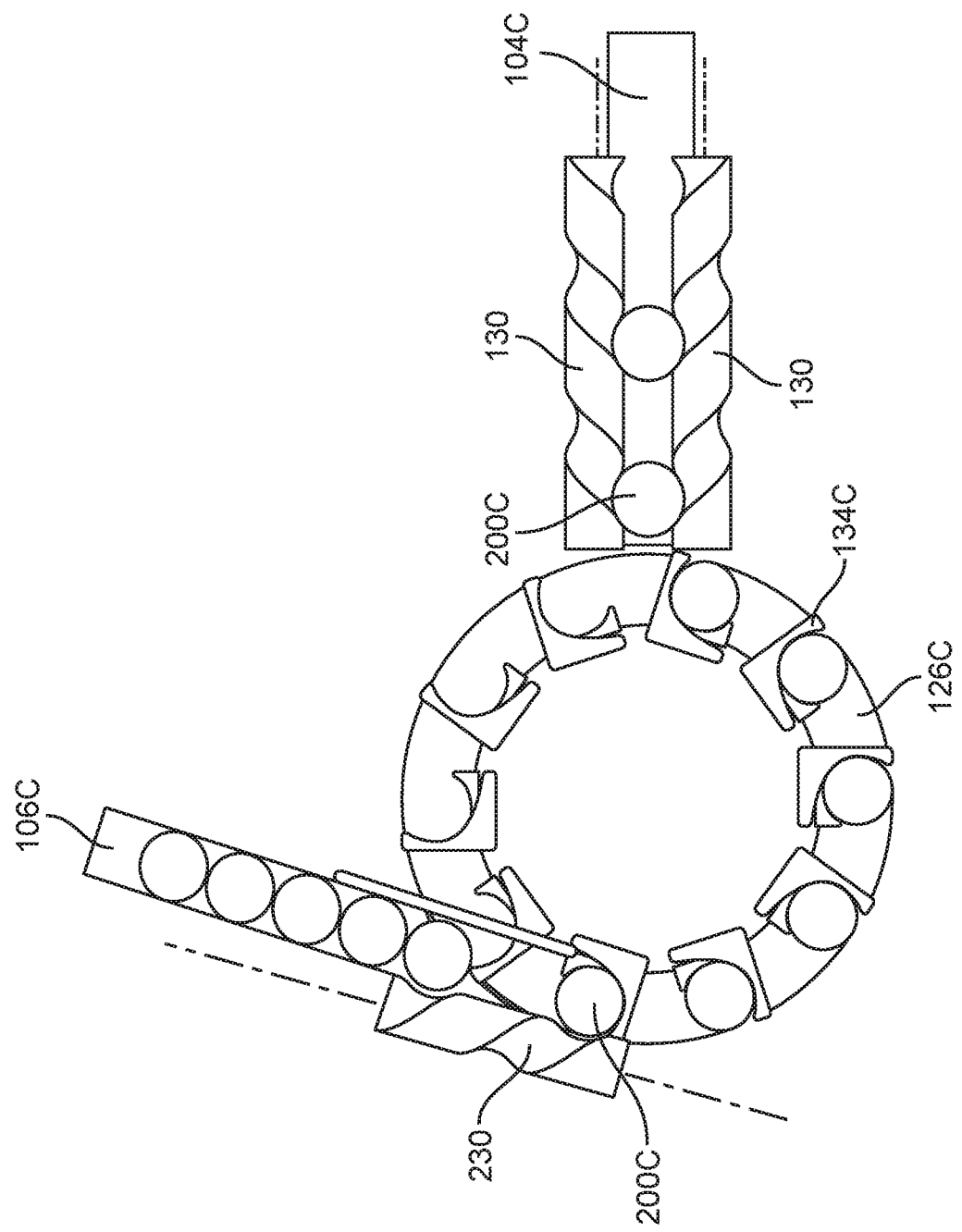
FIG. 6 is a plan view depicting a third feed conveyor, a third ring/section of a turntable mechanism, and a third output conveyor of the filling apparatus of FIG. 2 in isolation.

Each ring/section 126 of the turntable mechanism 124 can be configured to accommodate a fluid container of a particular size. For example, in one non-limiting embodiment, the first ring/section 126A can be configured to receive empty containers 200A of a first size from the first feed conveyor 104A and deliver filled containers 201A of the first size to the first output conveyor 106A. FIG. 4 depicts the first feed conveyor 104A, first section 126A and first output conveyor 106A in isolation. FIG. 5 depicts the second feed conveyor 104B, second section 126B and second output conveyor 106B in isolation. FIG. 6 depicts the third feed conveyor 104C, third section 126C and third output conveyor 106C in isolation. The second section 126B can be configured to receive empty containers 200B of a second size from the second feed conveyor 104B and deliver filled containers 201B of the second size to the second output conveyor 106B. The third section 126C can be configured to receive empty containers 200C of a third size from the third feed conveyor 104C and deliver filled containers 201C of the third size to the third output conveyor 106C. In some embodiments, movement of the filled containers from one or more of the sections 126A-C to one or more of the output conveyors may be facilitated by one or more rotating helical screws similar to those used to deliver containers to the sections 126A-C as described herein. One example of a rotating helical screw 230 that can be used to facilitate movement of filled containers 201C to output conveyor 106C is depicted in FIG. 6.

In some embodiments, one or more of the feed conveyors 104A-C can be positioned radially with respect to the common axis 128, so as to extend radially outward from the turntable mechanism 128. As further depicted in FIG. 3, in some embodiments, the height of each feed conveyor 104A-C can be positioned so as to provide a desired vertical spacing between the fill ports 132A-C and the tops of the respective containers 200A-C of different sizes.

As depicted, the feed conveyors 104A-C can include a section having a pair of opposed helical screws 130 configured to separate empty fluid containers 200A-C from one another by a predefined distance (D) during transport along a portion of the fluid production line 100. Other transport mechanisms, such as a traditional conveyor belt, roller bed or gravity fed system are also contemplated.

In some embodiments, one or more of the output conveyors 106A-C can be tangentially positioned with respect to the respective sections 126A-C of the turntable mechanism 124, thereby enabling a smooth transition of the filled fluid containers 200A-C as they pass from the turntable mechanism 124 to the respective output conveyor 106A-C. Like the feed conveyors 104A-C, the elevation of the output conveyors 106A-C can be configured to enable the tops, bottoms or fill line levels of the fluid containers 200A-C to remain level with respect to a gravitational frame of reference throughout the filling process. The output conveyors 106A-C can utilize any of a number of transport mechanisms to convey the filled containers 200A-C along the fluid production line 100, such as a conveyor belt, roller bed, opposed helical screws, gravity-assisted system, or the like.

The rings/sections 126A-C of the turntable mechanism 124 can be configured as concentric rings. For example, as depicted, the first section 126A can be configured as a ring surrounding the common axis 128. The second section 126B can be configured as a ring concentrically surrounding the first section 126A. The third section 126C can be configured as a ring concentrically surrounding the second section 126B. Collectively, the first, second and third sections 126A-C can rotate about the common axis 128.

In other embodiments, the rings/sections 126A-C can rotate at their own respective rotational rates, thereby, for example, enabling the filling of containers of a first size 200A at a faster rate than containers of a second or third size 200B/C. In other embodiments, any two or more of the sections 126A-C can be collectively synced together to rotate in unison at the same rate of rotation. For example, in one embodiment, the various sections 126A-C can be integrally formed into a single piece, unitary turntable 124. In some embodiments, the time necessary to fill containers of different sizes can be compensated for by the spacing afforded by an increased circumferential distance of the larger concentric sections 126B/C, by adjustment of the flow rates through the nozzles 132A-C, by spacing of the containers as determined by the feed conveyors 104A-C, or a combination thereof.

Figure 3:
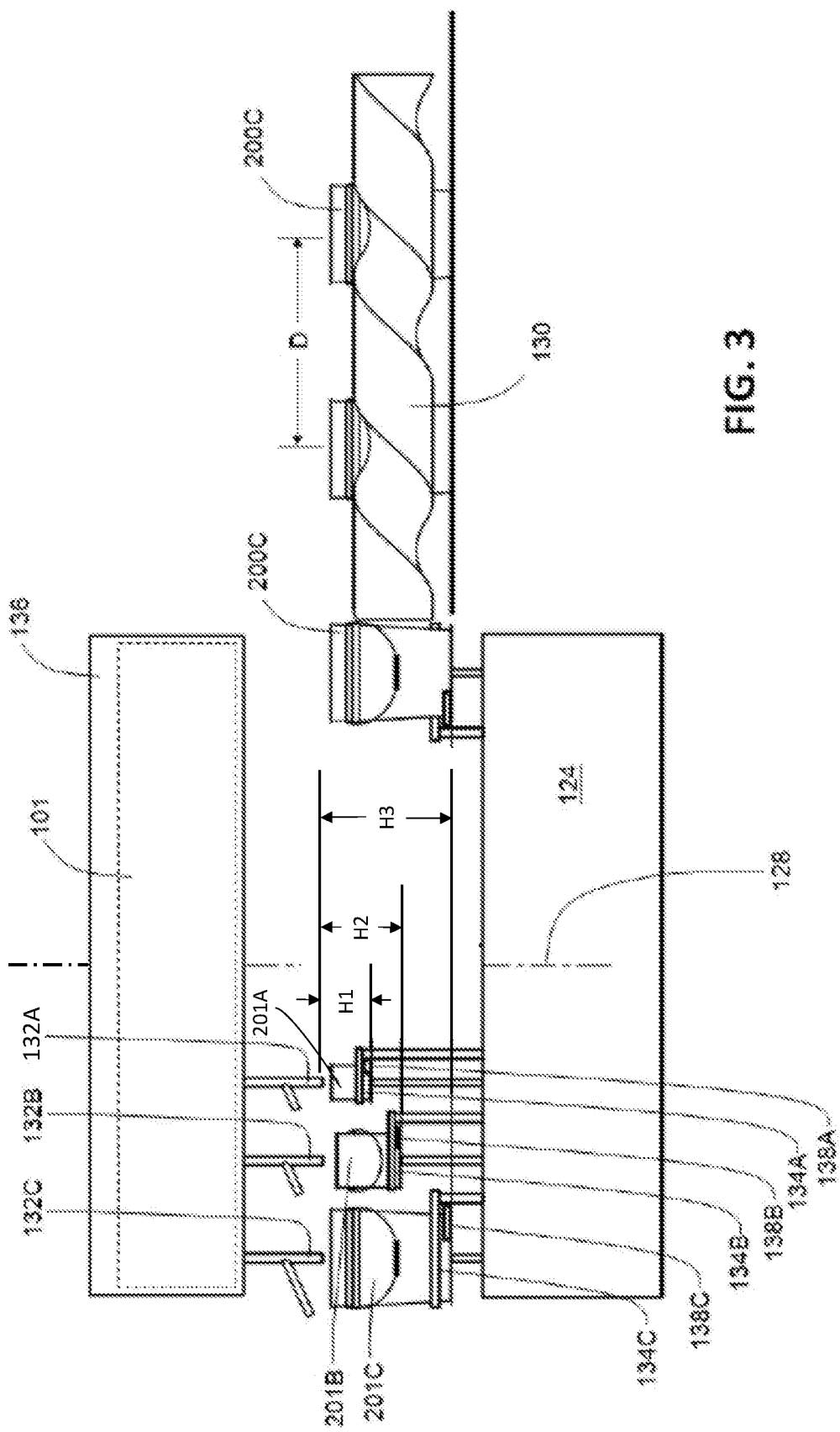
FIG. 3 is a profile view of the filling apparatus of FIG. 2.

As depicted, each of the first, second and third rings/sections 126A-C include a plurality of fluid container receptacles 134A-C configured to optimally position the respective fluid containers 200A-C on the turntable mechanism 124. As further depicted in FIG. 3, in some embodiments, the height of each fluid container receptacle 134A-C can be positioned so as to provide a desired vertical spacing between a common height and the heights (e.g., tops, fill lines, etc.) of the respective containers 200A-C of different sizes and/or the respective fluid container receptacles 134A-C. For example, as depicted in FIG. 3, the first fluid container receptacle 134A can have a first height of H1 relative to the fill port height, the second fluid container receptacle 134B can have a second height of H2 relative to the fill port height, and a third fluid container receptacle 134C can have a third height of H3 relative to the fill port height. The common height from which the vertical spacing is measured may, for example, be the height of the fill valves 132A-C, the fill ports on fill valves 132A-C, the height of fluid provided in the fill vessel 136 feeding the fill valves 132A-C, etc.

In one or more embodiments, the tops, bottoms, or fill line levels of the fluid containers 200A-C may remain level with respect to a gravitational frame of reference throughout the filling process. In one or more embodiments, the various rings/sections 126A-C of the turntable 124 a may lie in a common substantially horizontal plane.

As depicted in FIG. 3, a fill vessel 136 can be positioned above the turntable mechanism 124. The fill vessel 136 can be filled with a batch of coating product 101 for the filling of the fluid containers 200. A first fill valve 132A, second fill valve 132B, and third fill valve 132C can extend from the fill vessel 136. In one embodiment, the fill vessel 136 can be configured as a single, large tank configured to hold a batch of coating product. In another embodiment, the fill vessel 136 can include a plurality of concentric, radial troughs, positioned to provide a steady flow of coating product to each of the respective fill valves 132A-C.

In some embodiments, at least one fill valve 132A-C and its respective fill port can be positioned above each fluid container receptacle 134. In some embodiments, multiple fill valves, fill ports or orifices can be positioned above each container receptacle 134. In some embodiments, the fill vessel 136 can be configured to rotate about the common axis 124 at the same rate as the turntable mechanism 124 or the respective sections 126A-C, such that a given fill valve 132 remains over a given fluid container receptacle 134 during collective rotation of the turntable 124 and fill vessel 136, thereby enabling continuous filling of the containers and eliminating the need to pause or ratchet the turntable underneath the fill valves 132 during the container filling process.

As depicted in FIG. 3, a weight sensor 138A-C can be positioned on each fluid container receptacle 134A-C. The weight sensors 138A-C can be configured to measure a tare weight of the empty fluid container upon positioning of the empty container 200A-C on the respective fluid container receptacle 134A-C. Thereafter, filling of the containers 200A-C can begin. Upon filling of the containers 200A-C to a desired level, the weight sensors 138A-C can send a shut off signal to the fill valve 132A-C, thereby closing the fill valve 132A-C.

As depicted, each of the first, second and third sections 126A-C can include a total of ten fluid container receptacles 134A-C; although other quantities of fluid container receptacles 134 are also contemplated. For example, in another embodiment, the first section 126A can include sixteen 1-quart sized fluid container receptacles 134A, the second section 126B can include twelve 1-gallon sized fluid container receptacles 134B and the third section 126C can include eight 5-gallon sized fluid container receptacles 134B. In yet another embodiment, in an effort to maximize production, the quantity of fluid container receptacles 134A-C can be determined based on the respective fill rates of the containers. For example in one embodiment, the number of fluid container receptacles 134A-C and the respective rotational speeds of the various sections 126A-C of the turntable 124 can be adjusted to simultaneously fill about forty-eight 1-quart containers, about thirty-six 1-gallon containers, and between about twenty and twenty-four 5-gallon containers each minute.

Accordingly, through the use of a multi-section 126 rotary split filler 102, the fluid production line 100 is configured to continuously fill multiple different sizes of containers in parallel, thereby not only enabling the different sizes of containers to be simultaneously filled with a common batch coating product 101, but also significantly decreasing the production time necessary to fill the containers. For example, in some embodiments, the fluid production line 100 can be configured to simultaneously fill containers of various sizes at a rate of approximately 168 gallons per minute. For higher viscosity fluids, such as thick paints and other coating products, the fill rate may be in a range from about 140 gallons per minute to about 155 gallons per minute. Other fill rates are also contemplated. For example, in some embodiments, the total fill rate from the common batch of fluid can be at least about 50 gallons per minute, at least about 80 gallons per minute, at least about 110 gallons per minute, or at least about 140 gallons per minute, and up to about 100 gallons per minute, up to about 130 gallons per minute, up to about 160 gallons per minute, or up to about 190 gallons per minute.

In operation, multiple empty fluid containers of different sizes 200A-C can be transported to the rotary split filler 102 via respective separate feed conveyors 104A-C (collectively referred to as a feed conveyor mechanism). Each of the feed conveyors 104A-C can be configured to position the containers of different sizes 200A-C on respective separate sections 126A-C of the turntable mechanism 124, beneath a respective fill valve 132A-C. The sections 126A-C of the turntable mechanism 124 can rotate about a common axis 128 while the containers of different sizes 200A-C are simultaneously filled with a designated quantity from a common batch of fluid. Upon completion of filling, the turntable mechanism 124 can deliver the filled fluid containers 200A-C of different sizes to respective separate output conveyors 106A-C for further transport along the fluid production line 100.

In some embodiments, filling operations on any one of the respective rings/sections 126A-C can be selectively turned on or off as desired. This may be useful where, for example, the desired number of containers of one size (e.g., the largest containers) on one of the rings/sections 126A-C has been filled (or, alternatively, when the desired number of containers of two different sizes on two different rings/sections 126A-C have been filled), but filling of containers of one or more other sizes is to be continued on the remaining rings/sections 126. In one or more embodiments, the rate at which the containers in the remaining rings/sections 126 may increase after filling of one or more selected rings/sections 126 has been turned off. That increased fill rate may allow for an increase in the rate at which the containers are filled and transferred to the output conveyor(s) 106A-C (which corresponds to an increased rotational speed of the remaining rings/sections 126).

In one illustrative embodiment of such an increase in fill rate associated with terminating the filling of containers on one ring/section in which containers of three different sizes (e.g., quart, gallon, and five gallon containers) are being filled, the rings/sections 126A-C may be rotated at a speed of one revolution per minute (rpm) while a cumulative flow rate of liquid delivered to the containers is 120 gallons per minute (gpm) (with 94 gpm delivered to the 5-gallon containers, 20 gpm delivered to the gallon containers, and 6 gpm delivered to the quart containers). When the desired number of 5-gallon containers have been filled, the fill valves used to deliver liquid to the ring/section carrying the 5-gallon containers are closed. At that point, the cumulative flow rate of 120 gpm may be maintained while the speed at which the rings/sections carrying the quart and gallon sized containers rotate may be increased to, e.g., 2.7 rpm (with 104 gpm delivered to the gallon containers, and 16 gpm delivered to the quart containers). Increasing the rotational speed of the rings/sections will typically require corresponding increases in the rate at which the containers are delivered to and removed from the rings/sections, as well as increases in the speed at which the fill valves and fill vessel are rotated.

Although the depicted illustrative embodiments of the filling apparatus and the fluid production lines described herein are configured to fill containers having three different sizes on three different rings/sections, one or more alternative embodiments of the filling apparatus and/or fluid production lines described herein that include three (or more) different rings/sections rotating about a common axis may include two rings/sections that are configured to fill containers of the same size while the third ring/section is configured to fill containers of a different size than the same-sized containers filled on the two rings/sections. For example, in a filling apparatus and/or fluid production line in which two rings/sections are configured to fill gallon size containers (with appropriate feed and output conveyors), one or more additional rings/sections may be configured to fill quart size containers, 5-gallon containers, etc.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.\

For purposes of interpreting the claims, it is expressly intended that the provisions of 35 U.S.C. § 112(f) are not to be invoked unless the specific terms "means for" or "step for" are recited in a claim.

What is claimed is:
1. A filling apparatus comprising:
a feed conveyor mechanism including two or more feed conveyors, wherein each of the two or more conveyors is respectively configured to transport a fluid container of a different size along a manufacturing line;
a turntable mechanism including two or more concentric rings, wherein each of the two or more concentric rings is configured to receive a fluid container from the respective two or more feed conveyors and rotate about a common axis while filling the fluid containers via at least two fill ports; and an output conveyor mechanism including two or more output conveyors, wherein each of the two or more output conveyors is respectively configured to receive a filled fluid container of a different size from the turntable mechanism for further transport along the manufacturing line;

wherein each of the two or more concentric rings includes a plurality of fluid container receptacles configured to position the fluid containers on the two or more concentric rings, wherein the height of the fluid container receptacles in each of the two or more concentric rings is selected to position the fluid containers on each of the fluid container receptacles at a selected height relative a common reference height.

2. The filling apparatus of claim 1, wherein the filling apparatus is configured to simultaneously fill empty fluid containers of different sizes.

3. The filling apparatus of claim 1, wherein the filling apparatus is configured to fill the fluid containers with a common fluid from a single batch of fluid.

4. The filling apparatus of claim 1, wherein the common reference height is a height of the fill ports.

5. The filling apparatus of claim 1, wherein at least one of the two or more feed conveyors is radially positioned with respect to the common axis of the turntable mechanism.

6. The filling apparatus of claim 1, wherein at least one of the two or more feed conveyors includes a pair of opposed helical screws configured to separate empty fluid containers from one another by a predefined distance during transport along the manufacturing line.

7. The filling apparatus of claim 1, wherein at least one of the two or more output conveyors are tangentially positioned with respect to the two or more concentric rings of the turntable mechanism.

8. A fluid production line for fluid containers of different sizes, the fluid production line comprising:
a feed conveyor mechanism including a first feed conveyor, a second feed conveyor and a third feed conveyor, wherein each of the first, second and third feed conveyors is respectively configured to transport fluid containers of different sizes along the fluid production line;
a turntable mechanism including a first section, a concentric second section and a concentric third section, wherein each of the first, second and third sections is configured to receive the fluid containers from the respective first, second and third feed conveyors and rotate about a common axis to position the fluid containers beneath a plurality of fill ports configured to fill each of the different sizes of the fluid containers positioned on the respective first, second and third sections with a desired quantity of fluid, wherein the first, second and third sections of the turntable mechanism are configured to rotate about the common axis at different rates; and
an output conveyor mechanism including a first output conveyor, a second output conveyor and a third output conveyor, wherein each of the first, second and third output conveyors is respectively configured to receive the filled fluid containers of different sizes from the turntable mechanism for transport along the fluid production line.

9. The fluid production line of claim 8, further comprising at least one of a container preparation station, a labeling station, a lidding station, a case packing station, a rotary elevator, and a distribution portion.

10. The fluid production line of claim 8, wherein the fluid production line is configured to fill the fluid containers with a common fluid from a single batch of fluid.

11. The fluid production line of claim 8, wherein the first, second and third sections of the turntable mechanism each includes a plurality of fluid container receptacles configured to optimally position the fluid containers on the turntable mechanism.

12. The fluid production line of claim 8, wherein the concentric second section is configured to receive a larger sized fluid container than the first section.

13. The fluid production line of claim 8, wherein the concentric third section is configured to receive a larger sized fluid container than the second section.

14. The fluid production line of claim 8, wherein each of the first, second and third sections includes a plurality of fluid container receptacles configured to position the fluid containers on the first, second and third sections, wherein the height of the fluid container receptacles in each of the first, second and third sections is selected to position the fluid containers on each of the fluid container receptacles at a selected height relative a common reference height.

15. The fluid production line of claim 8, wherein the respective first, second and third feed conveyors are radially positioned with respect to the common axis of the turntable mechanism.

16. The fluid production line of claim 9, wherein at least one of the first, second and third feed conveyors includes a pair of opposed helical screws configured to separate empty fluid containers from one another by a predefined distance during transport along the fluid production line.

17. The fluid production line of claim 8, wherein the respective first, second and third output conveyors are tangentially positioned with respect to the respective first, second and third sections of the turntable mechanism.

18. A fluid production line for fluid containers of different sizes, the fluid production line comprising:
a feed conveyor mechanism including a first feed conveyor, a second feed conveyor and a third feed conveyor, wherein each of the first, second and third feed conveyors is respectively configured to transport fluid containers of different sizes along the fluid production line;
a turntable mechanism including a first section, a concentric second section and a concentric third section, wherein each of the first, second and third sections is configured to receive the fluid containers from the respective first, second and third feed conveyors and rotate about a common axis to position the fluid containers beneath a plurality of fill ports configured to fill each of the different sizes of the fluid containers positioned on the respective first, second and third sections with a desired quantity of fluid, wherein each of the first, second and third sections includes a plurality of fluid container receptacles configured to position the fluid containers on the first, second and third sections, wherein the height of the fluid container receptacles in each of the first, second and third sections is selected to position the fluid containers on each of the fluid container receptacles at a selected height relative a common reference height; and
an output conveyor mechanism including a first output conveyor, a second output conveyor and a third output conveyor, wherein each of the first, second and third output conveyors is respectively configured to receive the filled fluid containers of different sizes from the turntable mechanism for transport along the fluid production line.

19. The fluid production line of claim 18, further comprising at least one of a container preparation station, a labeling station, a lidding station, a case packing station, a rotary elevator, and a distribution portion.

20. The fluid production line of claim 18, wherein the fluid production line is configured to fill the fluid containers with a common fluid from a single batch of fluid.

21. The fluid production line of claim 18, wherein the first, second and third sections of the turntable mechanism each includes a plurality of fluid container receptacles configured to optimally position the fluid containers on the turntable mechanism.

22. The fluid production line of claim 18, wherein the concentric second section is configured to receive a larger sized fluid container than the first section.

23. The fluid production line of claim 18, wherein the concentric third section is configured to receive a larger sized fluid container than the second section.

24. The fluid production line of claim 18, wherein at least one of the first, second and third feed conveyors includes a pair of opposed helical screws configured to separate empty fluid containers from one another by a predefined distance during transport along the fluid production line.

\* \* \* \* \*